(12) United States Patent
Singhal

(10) Patent No.: US 11,019,323 B2
(45) Date of Patent: May 25, 2021

(54) APPARATUS AND METHOD FOR 3D LIKE CAMERA SYSTEM IN A HANDHELD MOBILE WIRELESS DEVICE

(71) Applicant: Tara Chand Singhal, Torrance, CA (US)

(72) Inventor: Tara Chand Singhal, Torrance, CA (US)

( * ) Notice: Subject to any disclaimer, the term of this patent is extended or adjusted under 35 U.S.C. 154(b) by 1099 days.

(21) Appl. No.: 14/997,560

(22) Filed: Jan. 17, 2016

(65) Prior Publication Data

US 2016/0234477 A1 Aug. 11, 2016

Related U.S. Application Data

(60) Provisional application No. 62/112,869, filed on Feb. 6, 2015.

(51) Int. Cl.
*H04N 13/239* (2018.01)
*H04N 13/189* (2018.01)
*H04N 13/00* (2018.01)

(52) U.S. Cl.
CPC ......... *H04N 13/239* (2018.05); *H04N 13/189* (2018.05); *H04N 2013/0088* (2013.01)

(58) Field of Classification Search
CPC ............. H04N 13/004; H04N 13/0239; H04N 13/0282; H04N 13/0296
USPC .......................................................... 348/47
See application file for complete search history.

(56) References Cited

U.S. PATENT DOCUMENTS

| | | | |
|---|---|---|---|
| 9,137,517 B2* | 9/2015 | Geris | H04N 13/0239 |
| 9,148,651 B2* | 9/2015 | Geris | H04N 13/0242 |
| 9,325,968 B2* | 4/2016 | Baldwin | H04N 13/0011 |
| 9,503,703 B1* | 11/2016 | Ramaswamy | G06T 5/006 |
| 9,729,785 B2* | 8/2017 | Choe | H04N 5/23222 |
| 9,749,619 B2* | 8/2017 | Mann | H04N 13/0497 |
| 2005/0175257 A1* | 8/2005 | Kuroki | H04N 7/144 382/278 |
| 2010/0231691 A1* | 9/2010 | Lee | H04N 5/23212 348/47 |
| 2011/0098083 A1* | 4/2011 | Lablans | G03B 35/00 455/556.1 |
| 2011/0242103 A1* | 10/2011 | Han | H04N 13/0022 345/419 |
| 2011/0304697 A1* | 12/2011 | Kim | H04N 5/23293 348/47 |
| 2013/0229529 A1* | 9/2013 | Lablans | H04N 5/23238 348/169 |
| 2013/0258066 A1* | 10/2013 | Asano | G03B 35/08 348/47 |

(Continued)

OTHER PUBLICATIONS

GSMArena, LG Optimus 3D review, Jul. 22, 2011.*
Fuji Finepix Real 3D W3 http://www.amazon.com/Fujifilm-FinePix-Real-Discontinued-Manufacturer/dp/B003ZHV70M.

*Primary Examiner* — Francis Geroleo

(74) *Attorney, Agent, or Firm* — Steve Roeder, Esq.

(57) ABSTRACT

A camera system for use in a mobile handheld computing and communication device with a front side with a display screen and a back side has two separate and independent cameras positioned on the back side of the device, wherein the cameras have a physical separation between them of substantially the same separation as between the eyes on a human face and, wherein the camera system creates a 3D-Like image of an object for storage and for viewing on a display screen.

17 Claims, 10 Drawing Sheets

(56) References Cited

U.S. PATENT DOCUMENTS

| | | | | |
|---|---|---|---|---|
| 2013/0278729 A1* | 10/2013 | Choi | ............... | H04N 7/14 |
| | | | | 348/47 |
| 2013/0286007 A1* | 10/2013 | Lee | ............... | G06T 15/00 |
| | | | | 345/419 |
| 2014/0015937 A1* | 1/2014 | Adachi | ............ | H04N 13/0022 |
| | | | | 348/47 |
| 2014/0085423 A1* | 3/2014 | Lee | ............ | H04N 13/0239 |
| | | | | 348/46 |
| 2015/0163478 A1* | 6/2015 | Geiss | ............ | H04N 13/0242 |
| | | | | 348/47 |

\* cited by examiner

Image of a dot as seen by two eyes or two cameras separately image from Left camera     image from right camera

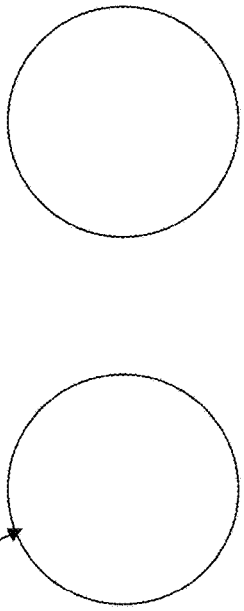

42

Image of a dot as seen by two eyes or two cameras as a single image image from Left camera     image from right camera

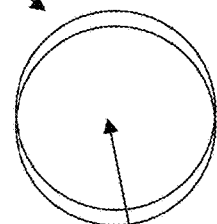

3D like image

44

46 →

Each pixel of two pixels side by side captures the visual essence of the same dot on a distant object with a different angle of view.

Thus, two pixels positioned side by side from a left and a right camera superimpose the two separate dot images to simulate 3D like effect to the mind/brain

FIGURE 2C

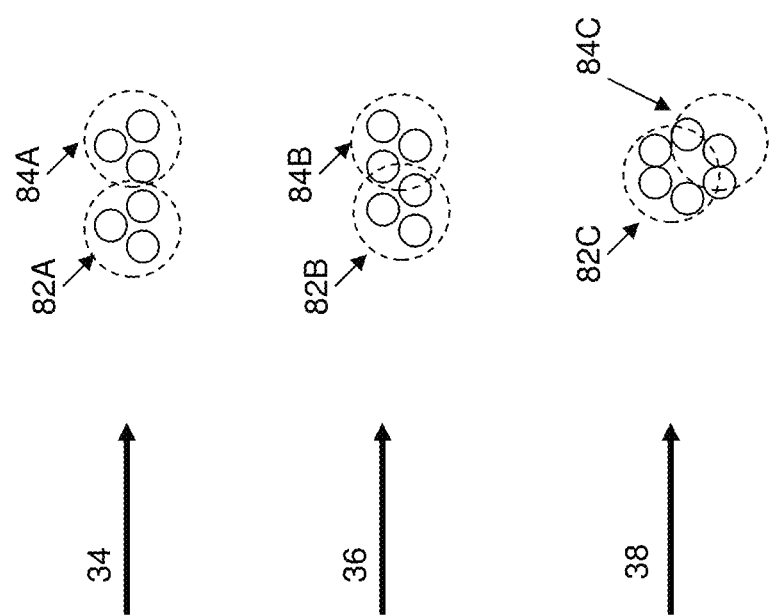

Operating system 50  Processor 52, Memory 54 Storage 56

At step 100, launching Camera function by a user

At step 102, enabling 3D mode by a user

At step 104, activating camera by a user

At step 106 capturing by cameras left and right images and storing in temp memory At step 108 merging by logic 30 the two images to create a 3D-like image At step 110, storing 3D-like image.

At step 112, applying auto focus logic

At step 114, displaying 3D-like image on a display screen of the device 12

FIGURE 4

APPARATUS AND METHOD FOR 3D LIKE CAMERA SYSTEM IN A HANDHELD MOBILE WIRELESS DEVICE

CROSS REFERENCE

This application claims priority from provisional application Ser. No. 62/112,869, filed Feb. 6, 2015, titled "Apparatus and Method for a 3D Camera Systems in Handheld Mobile Wireless Device" of Tara Chand Singhal.

FIELD OF THE INVENTION

A camera system for use in a mobile handheld computing and communication wireless device; the camera system creates 3D-Like image of an object for storage and for viewing on a display screen.

BACKGROUND

Smart phones and similar devices such as different size tablet computing devices have become very popular. These devices have many desirable features. One of these desirable features in these devices is a digital camera. It is a triumph of engineering to have good quality digital camera in the form-factor or such devices which notionally are half an inch or less in thickness.

Since the advent of smart phones with digital cameras, these digital cameras are constantly being improved upon by the various companies in this competitive market place of smart phones.

One of these improvements has been in increasing pixel density or picture resolution in the camera by increasing the number of pixels. Another of these improvements has been having a front facing camera in addition to a back facing camera that would provide the ability to have a face to face visual communication. Based on the manner of use and application of these, front and back facing camera, the back facing camera has a large number of pixels than the front facing camera.

The physical size of the digital camera in a smart phone like device is limited by the physical dimension of the smart phone device, specifically in the thickness of the device which is notionally ⅓". Therefore, other improvements in digital cameras in smart phones have been in improving the optical quality of the lens that would be applicable to such size restrictions. Other improvements have been in having an ability to digitally focus the camera.

It is believed that the digital camera in smart phones can be further improved. Hence it is an objective to provide better or improved digital cameras in the smart phones. Yet another objective is to have digital cameras in handheld wireless communication and communication devices such as smart phone and tablet computers that provide for improved or more realistic picture quality.

SUMMARY

Embodiments for a camera system that is for use exclusively in a mobile handheld wireless communication and computing device, like a smart phone or a tablet computer, and is used for creating a 3D-like image of an object or a scene, are described.

It is believed, what is termed here as 3D-Like image is in reality a stereoscopic image. A stereoscopic image is defined as an image as seen by the two eyes on a human face and is not really a 3D or 3D-like image as that term is understood by others and that has been popularized by the movie industry.

From Wikipedia: Stereoscopy (also called stereoscopic) is a technique for creating or enhancing the illusion of depth in an image by means of stereopsis for binocular vision. Any stereoscopic image is called a stereogram. Originally, stereogram referred to a pair of stereo images which could be viewed using a stereoscope.

Most stereoscopic methods present two offset images separately to the left and right eye of the viewer. These two-dimensional images are then combined in the brain to give the perception of 3D depth. This technique is distinguished from 3D displays that display an image in three full dimensions, allowing the observer to increase information about the 3-dimensional objects being displayed by head and eye However for convenience in the specification herein, the term 3D-Like is used for a stereoscopic image as seen by the two eyes on a human face.

The wireless device has a front side with a display screen and has a back side that has a prior art digital camera system within the device size limitation in that the device is typically of a thickness that is notionally ⅓ of an inch.

The camera system of the embodiments herein for creating 3D-Like images has two separate and independent cameras positioned on the back side of the device. The camera system of the embodiments herein may also have two separate and independent cameras positioned on the front side of the device.

The cameras on the back side as well as on the front side of the device have a physical separation between them a distance that is substantially the same distance as between the eyes on a human face and notionally a distance or separation that is between two inches and two and half inches.

Each camera of the camera system has a body with a lens and a CCD image sensor behind the lens. Each camera body of the two cameras points to a distance away from the device in the same field of vision of the two cameras.

The camera system, using the two cameras captures two independent images of an object or a scene and using logic, merges these two images and creates 3D-Like image of an object for storage and for viewing on a display screen.

These and other aspects of the embodiments herein are further described in detail with the help of the accompanying drawings and the description, where similar numbers are used to identify the features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIGS. 2A, 2B, 2C and 2D are block diagrams that illustrate functional features of the present embodiments of a camera system for use in a handheld mobile wireless device;

FIG. 4 is a method diagram that illustrates features of a preferred embodiment of a camera system for use in a mobile wireless handheld device.

DESCRIPTION

Introduction

Figure 1A:
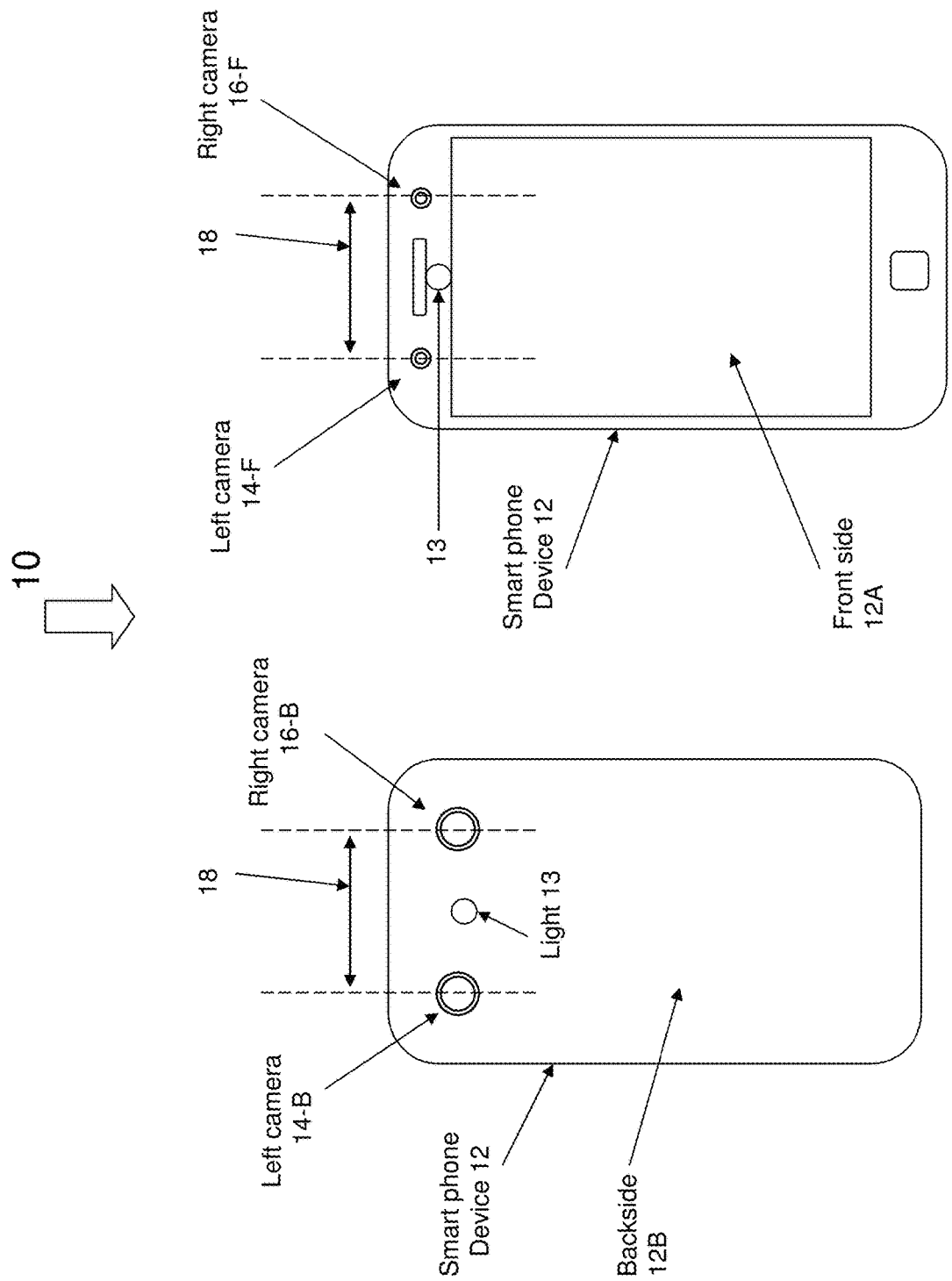
FIGS. 1A, 1B, 1C and 1D are block diagrams that illustrate features of the present embodiments of a camera system for use in a handheld mobile wireless device.

From the perspective of human vision, human eyes and the brain that processes the visual images as perceived by the human eyes is a fascinating and complex biological mechanism.

Each eye on a human face with the help of a lens, a retina, and a bundle of nerves as part of the retina carry visual stimuli signals from the retina to the brain and thus is capable of creating an image in the brain of what the eye sees.

The human face has two eyes side by side that are positioned approximately between two inches and two and half inches apart. Thus, each eye is creating a separate and independent image in the brain and the brain merges these two separate and independent images to create a single image. This single image is what is seen or perceived and is an image that is richer in details relative to what each eye sees individually.

That the eyes do see individually is borne out by the observation that when looking at a near object, and one or the other eye is visually blocked, and then repeated with the other eye, the image from one or the other eye shifts in place, thus illustrating the fact that the two eyes do see individually two separate individual images that are spatially apart from each other.

These two separate images are processed by the brain to be a single image and when seen by both the eyes are a richer image in details and color and thus appear to be a more vibrant or full image.

The brain further does the process of inverting the images as the images as perceived by the eye on the retina via the convex lens are inverted. Modern digital cameras which immediately display an output on a digital screen do much the same task of inverting the image.

Therefore, it is believed that having a system of cameras that have two cameras, a left camera and a right camera, on a camera device that simulate two human eyes in spatial reality would mimic use of two eyes on the human face and a logic in the camera system that merges these two images into a single image would produce a much richer image than seen by one camera alone.

It is believed, such a richer image with more details would be desirable for humans to be able to create and use. Hence the embodiments herein are directed to an invention of a camera system for exclusive use in smart phones and tablet computer and communication devices to take richer images by having two separate cameras on these devices in spatial proximity similar to what the eyes have on a human face.

In a preferred embodiment the camera system is described on a wireless mobile handheld device, in the form of a smart phone and a tablet computer, as that is the most common camera device that is preferred now-a-days by the users.

As illustrated with the help of FIGS. 1A, 1B, 1C, and 1D, a camera system 10 is for use in a handheld wireless mobile device 12. The device 12 has a front side 12A with a display screen and a back side 12B. The back side 12B has a left camera 14-B and a right camera 16-B where the right camera 16-B is positioned a distance 18 away from the left camera 14-B. The distance 18 is notionally two and half inches and substantially the same as the distance between the eyes on a human face.

The front side 12A also has a left camera 14-F and a right camera 16-F where the right camera 16-F is positioned a distance 18 away from the left camera 14-F. The distance 18 is notionally two inches and substantially the same as the distance between the eyes on a human face. There is also a provision of a light or flash 13 that may be used to illuminate an object.

As in prior art, a single camera in the front side of device 12 and a single camera in the backside of the device 12 play a different role. While the back camera is used for taking pictures like in a traditional camera and has more pixels in the CCD image sensor, the front camera is used for taking close pictures of human face and also as in a selfie, a self portrait image, and such a camera has fewer pixels and may have a smaller lens than the camera in the backside of device 12.

The same and similar features of different quantity of pixels and quality and size of lens are also replicated in camera system 10 of this invention. That is, the back cameras 14-B and 16-B have a much higher resolution in number of pixels and much larger lens relative to the front facing cameras 14-F and 16-F.

Figure 1B:
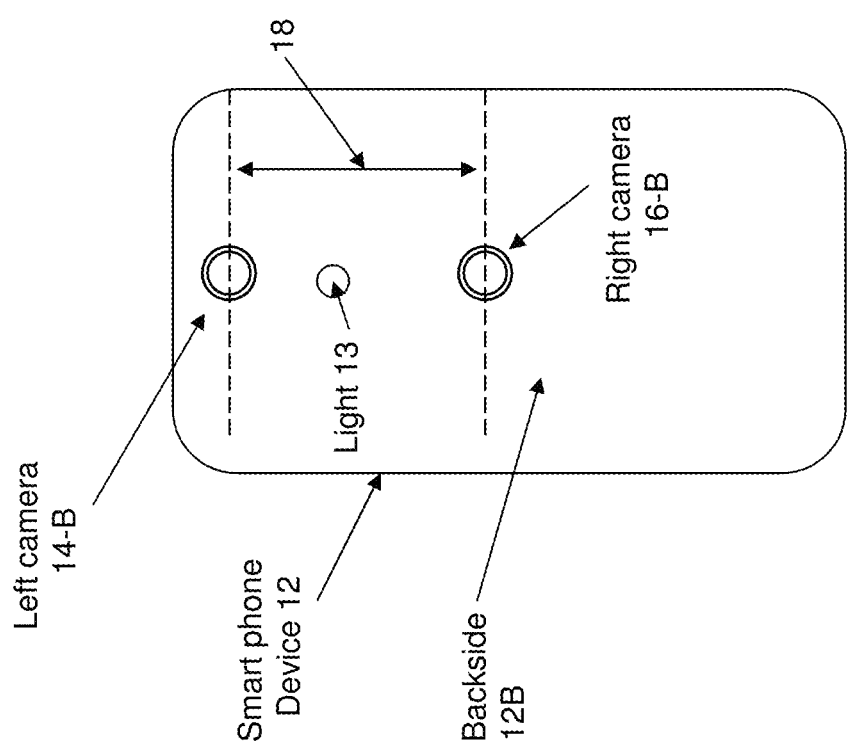

Some devices may not be wide enough to accommodate a two and a half inch separation, therefore, as illustrated in FIG. 1B, an alternative embodiment for positioning the left camera 14 and right camera 16 on the backside 12B of device 12 has two cameras positioned vertically with the same separation 18 as between the two eyes on a human face.

Figure 1C:
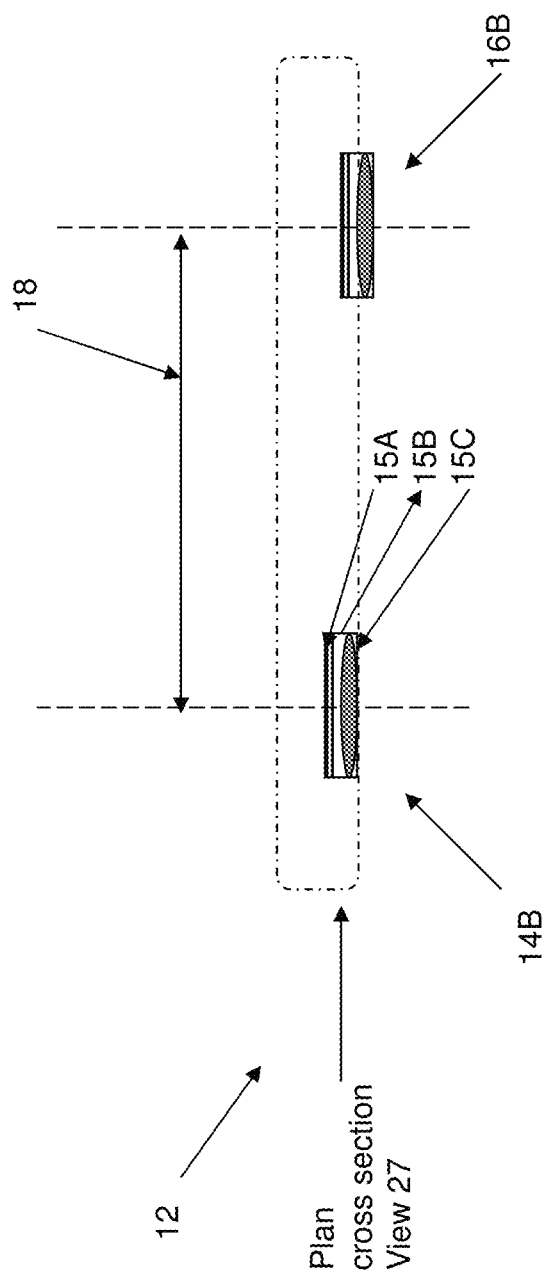

As illustrated in FIG. 1C, a cross sectional plan view 27 is shown of the device 12. The two cameras 14-B and 16-B are mounted on the backside of the device 12 in a manner similar as that of a single camera is mounted in a prior art device. Each camera 14-B or 16-B has image sensor 15A, a camera body 15B and lens 15C.

Figure 1D:
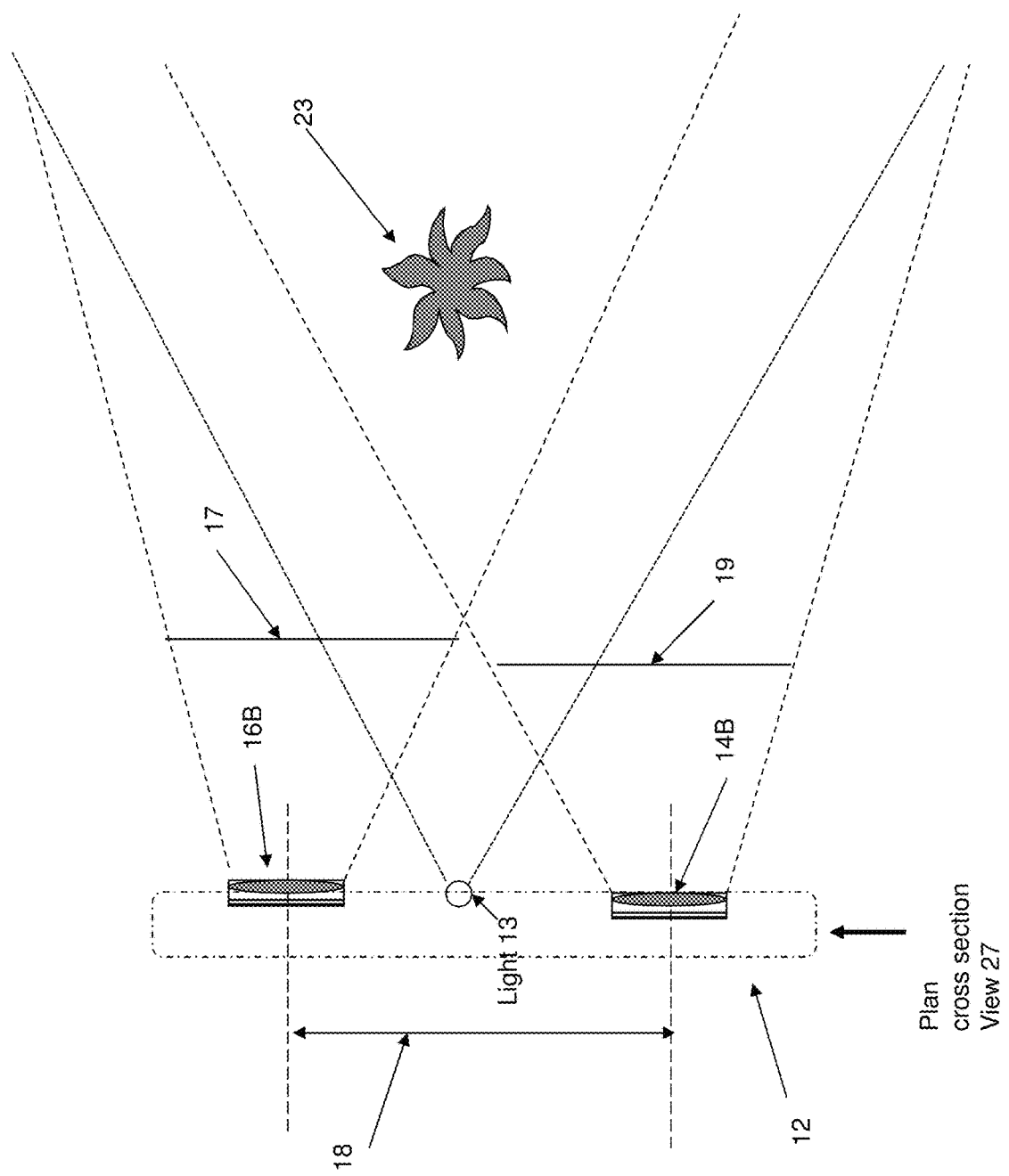

As illustrated in FIG. 1D, camera 14-B has a field of view 19 and camera 16-B has a field of view of 17. An object 23 is present in both views 17 and 19 and thus is able to be captured as separate and independent images by both cameras 14-B and 16-B.

What is described here for the back cameras 14-B and 16-B is equally applicable to the front cameras 14-F and 16-F, except the pixel size and the type of lens that would be used.

3D-Like Image Logic 30

Figure 2A:
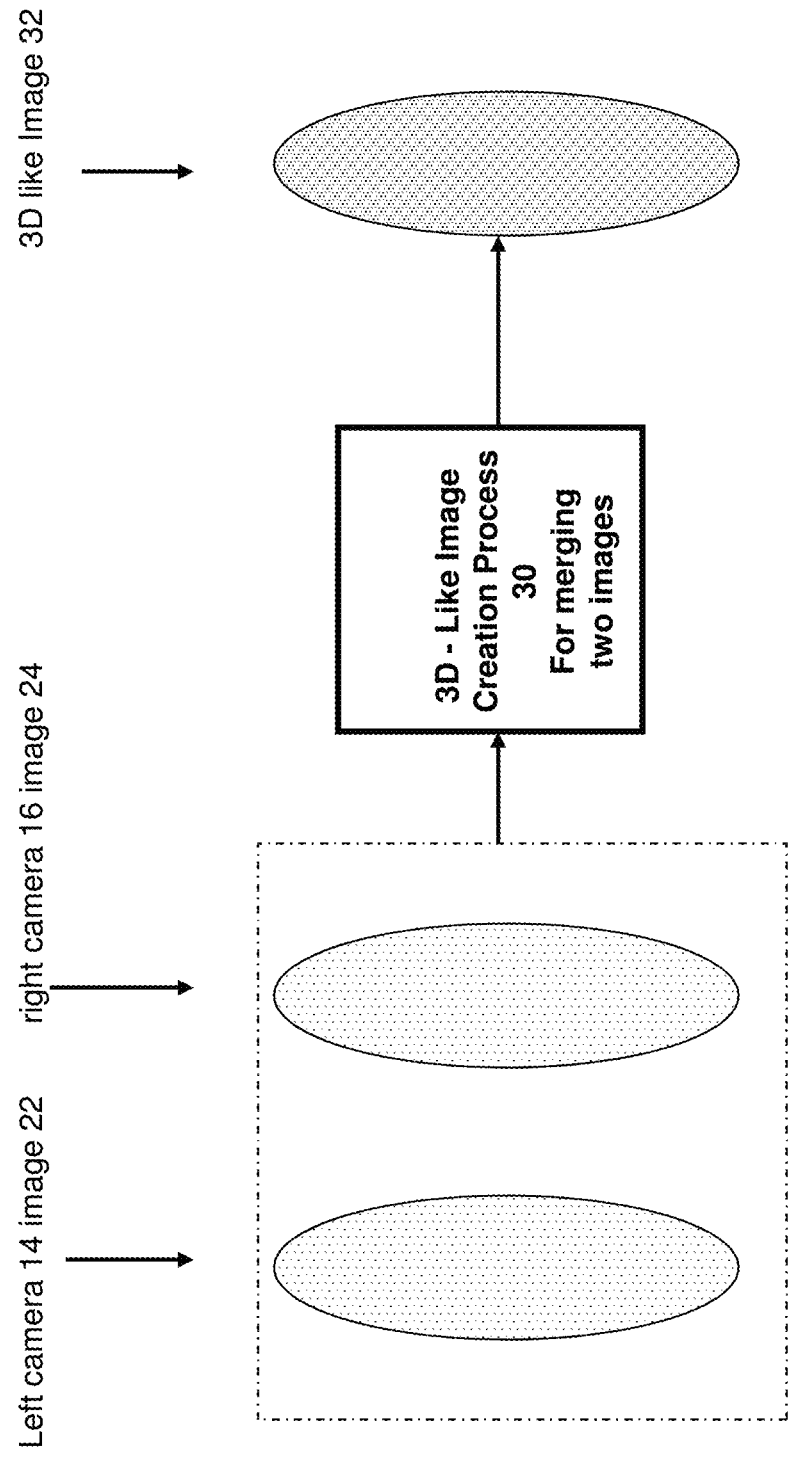
Figure 2B:
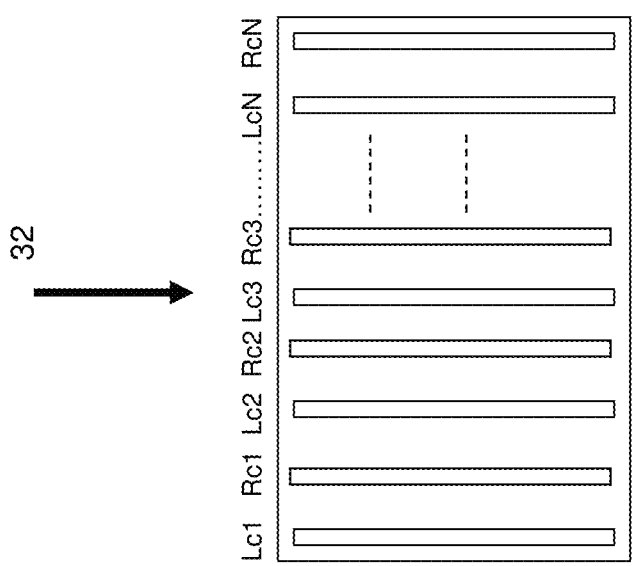

As illustrated with the help of FIGS. 2A and 2B, a simplified illustration of the features and functions of logic 30 of system 10 are described herein.

As illustrated in FIG. 2A, an image 22 from the left camera 14 and the image 24 from the right camera 16 are input to 3D-Like image creation process logic 30. The logic 30 merges the two images 22 and 24 and outputs a single 3D-Like image 32.

As illustrated in FIG. 2B, the logic 30 merges the two images 22 and 24 and creates the single image 32 by interspersing the columns of pixels from these images. As a simplified illustration, Lc1 is column 1 of pixels from left camera image 22 and Rc1 is a column 1 of pixels from right camera image 24. Then in a temporary memory of device 12, Rc1 is positioned right of and adjacent to Lc1. This process is repeated for Lc2 and Rc2, Lc3 and Rc3 and so on for each column of pixels from images 22 and 24.

It is believed, by positioning column of Rc1 to the right of the column of Lc1 pixels, preserves the relationship of the left and right images as seen by the eyes.

Thus the 3D-Like image 32 has double the number of pixels of either image 22 or image 24 and has pixels from both the images 22 and 24. That is the merged image 32 has all the details that has been captured separately by each of the cameras 14-B and 16-B.

As illustrated in FIG. 2C, the rationale for merging the images in this manner is illustrated. View 42 illustrates a visual image of two separate dots on an object that would be captured by two different cameras 14-B and 16-B. View 44 illustrates a combined or merged image that is a 3D-Like image of these two dots.

View 46 illustrates, the principal, it is believed is operative when merging two independent images using their pixels. Each pixel of two pixels side by side captures the visual essence of the same dot on a distant object with a different angle of view and with a different light effect.

Thus, two pixels positioned side by side from a left camera 14-B and a right camera 16-B, superimpose the two separate dot images to simulate a 3D-Like effect to the mind or brain. It is believed that the 3D-Like image, as can be seen with both eyes, is a richer image and therefore the 3D-Like image 32 produced by merging two separate images 22 and 24 is a richer image having all the visual details of the two separate images.

A prior art pixel when displayed or reproduced on a color display screen is in reality three pixels together, where each of these three pixels represents an intensity of a primary color of three primary colors. These three pixels each with a different intensity of a different primary color are perceived by the eye as a single pixel with a color that is a blend of the three primary color intensities. Therefore, a color screen can render a pixel in a very large range or shade of colors.

As illustrated in FIG. 2D, using a similar concept of placing the color pixel elements in close proximity, a prior art color pixel triplet may be placed side by side from a left camera and a right camera in different ways that would enable the pixel pair from a left and a right camera to be perceived as a single pixel with more color and depth richness relative to a pixel from a single camera alone.

As illustrative examples of that close placement, view 34 shows a left camera pixel 82A and a right camera pixel 84A side by side. View 36 shows a left camera pixel 82B and a right camera pixel 84B in a staggered pattern side by side. View 38 shows a left camera pixel 82C and a right camera pixel 84C in a circular pattern side by side. There may be other such arrangements that are not ruled out.

Figure 3:
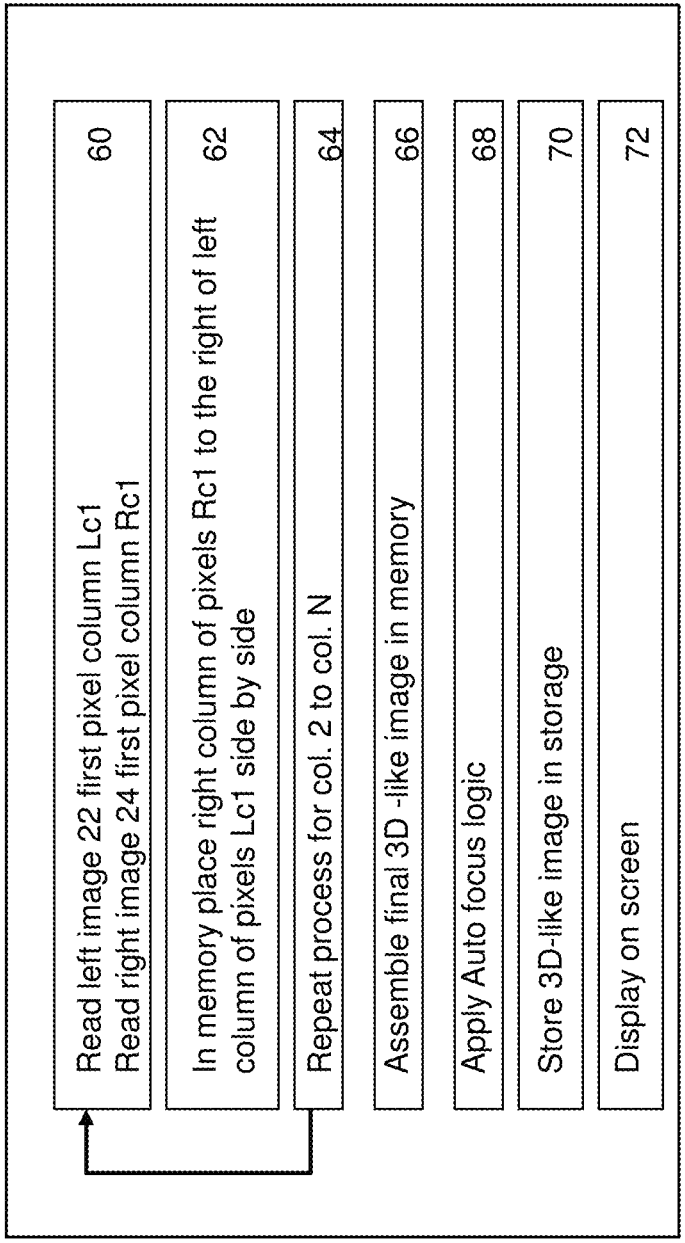
FIG. 3 is a block diagram that illustrates a preferred embodiment of 3D logic in the camera system for use in a handheld wires mobile device.

As illustrated in FIG. 3, the functions of logic 30 are illustrated. Function 60 reads left image 22 first pixel column Lc1 and then reads right image 24, first pixel column Rc1. Function 62 in a temporary memory of device 12, places or positions pixel column Rc1 to the right of pixel column Lc1. In function 64, this process is repeated for all columns of pixels from the left and right images. Function 66 assembles a final 3D-Like image 32 in memory.

Using function 68, prior art auto focus features of the camera are then applied to image 32. Using function 70 and 72, this image is then either stored and or displayed on the display screen of device 12.

It is believed this embodiment preserves the concept of two images from two cameras and the same logic is applicable as has been described earlier for merging the images from two front facing cameras.

In some modes of use this embodiment may be used in holding the device 12 in either a landscape orientation or as in a portrait orientation. When held in the portrait orientation, the two cameras positioned vertically take two separate images and these are believed to be similar as the images taken by the two cameras positioned horizontally side-by-side.

The spatial separation between the two cameras in the embodiments described herein is largely dependent on the size of the wireless device. Currently the larger size of the devices is being preferred by the public, as has been illustrated by the success of such larger devices from major manufacturers.

Therefore, device 12 manufacturers may decide which embodiment or both embodiments to offer in the market. While the results are same and similar the form-factor of the device may be slightly different.

Mode of Operation

In a simplified and a representative mode of operation, a user of a device 12 equipped with a camera system 10 would point the back of the device 12 with cameras 14-B and 16-B of system 10 towards an object or scene and take a picture as is normally done. In a similar manner, a user would point the front of device 12 with front cameras 14-F and 16-F of system 10 towards the face and take a picture as is normally done.

The camera system 10 is equally applicable to capturing video images which are a sequence of images at $\frac{1}{24}$ sec rate to create real time video. Further, as a simplified illustration, if the left camera is rated at 2 mega pixels and right camera is also rated at two mega pixels then the 3D-Like or merged image that is created by the camera system 10 is believed to be a four mega pixel image.

It is believed, this four mega pixel image created with the help of two different cameras is richer and more vibrant than a single image created with a four mega pixel camera. The reason for this, it is believed is that each pixel pair of the 3D-Like image has more details then would be available from two pixels side of a prior art 4-mega pixel camera, as each pixel of the pair of the pixel in a 3D-Like image has captured the light intensity from two different angles of the object or the scene.

The 3D-Like image 32 created by logic 30 may be stored with an identification that these images are different than those of prior art camera produced images. Such identification may be by name of the file or by the name of the file extension. Prior art such as Camera and Image Product Association (CIPA) standard for multiple picture format cameras may also be used Prior art images are stored identified by file name extensions such as jpg or mpeg or giff images based on which application program processed them. Other prior art application programs can also translate images from one format to another format.

The image 32 of the embodiments herein has a different pixel structure than a conventional prior art pixel image. One of these structural differences is that the image 32 is a rectangle horizontal shape image having more lines of vertical pixels than the number of horizontal lines of pixels. A further difference is that each pixel pair from a left and a right camera carries a richer light intensity representation of the same point on an object compared to from a prior art single camera pixel.

Therefore, it is believed that a different application program similar to many of the prior art image processing application program that has been adapted or modified for the processing and storage of image 32 image structure may be advantageously used.

The modified image processing application program would process and store images with these two attributes of the image 32. As a simplified illustration the image may be treated as a landscape format and each pixel pair is kept intact as a single but a binary representation of a single point of light intensity that is captured and stored in a pixel pair.

A CCD image sensor has elements or pixels that receive light intensity from different colors and have three different pixels each sensitive to the light of a different color, called primary colors. Each pixel triplet is perceived by the mind as a single pixel with combined color intensity of three colors where each pixel color represents a combination of three different light intensities.

The same concept is applicable to the cameras of camera system 10. Therefore, in reality, each pixel pair of image 32 is a pixel pair where each pixel of the pair itself is a triplet of three different color pixels that has captured the light intensity from three different colors.

Therefore, the adapted image application program takes that into account. Such an application program may be called as rich-image or true-image and the file extension of .rip or .tip may be used to identify image 32 and its application program. As a simplified illustration the image file 32 may be referred to as true-image.tip The technology of cameras, both their hardware and software and their miniaturization for use in handheld wireless devices, is considered prior art, except the adaptation of hardware and software logic as has been described in the embodiments herein.

A CCD image sensor converts the light falling on a pixel of the sensor into an electrical charge that is proportional to the intensity of light. The charge is then converted into a digital number. This digital number represents in a digital form the light that had had been received by a pixel in an instant in time. That is done for each color pixel in a color pixel triplet.

Thus the prior art images are stored where each pixel data is stored as a 24 bit vector or three bytes of data. Therefore in essence, a prior art image requires 3 bytes of storage for each pixel. If there are one million pixels, then the storage required is three million bytes. In reality the file is compressed for storage and is reduced to roughly one third in size by compression algorithms.

A 3D-Like image, as captured by the camera system 10 of the embodiments herein, would store a pixel pair as six bytes of data. Therefore, storage required by a 3D or true or rich image would be six million bytes. This image may also be compressed similar to prior art compression using prior art compression algorithms. Therefore, each 3D-Like image requires more storage or twice the storage than a conventional prior art image and this should be taken into account when using camera system 10 with the prior art device 12 operating system.

For the purpose of image storage and image processing, the second pixel data of the pixel pair may be stored as a delta. This is illustrated by a simplified example, where if the three bytes of first pixel data is 22 140 187 and the three bytes of second of the pair pixel data is 24 152 195, then the second pixel data may be stored as a delta of 2 12 8 over the first pixel data. This is, because it is believed that the delta captures the same essential data with a different lighting condition. This may likely have the effect of reducing image size when stored as a compressed image.

It is believed, as a simplified illustration, that a single image obtained with a single 4 mega pixel camera would not be as good as a single merged image of 4 mega pixels derived by merging two images of 2 mega pixels each. Thus the camera system of the embodiments would produce a richer image or a 3D-Like image.

Method of Operation

As illustrated in FIG. 4, a method for a camera system 10 for use in a handheld device has the following steps where all the steps may not be used or used in the order specified.

The following method steps are carried out in device 12 with the help of device operating system 50, device processor 52, memory 54 and storage 56 of the camera system 10.

At step 100, launching Camera function by a user

At step 102, enabling 3D-Like mode by a user

At step 104, activating camera by a user

At step 106, capturing by both cameras left and right images and storing in temporary memory At step 108 merging by logic 30 the two images to create a 3D-Like image 32

At step 110, storing the 3 D image 32 as a single image 32

At step 112, applying prior art auto focus logic to image 32

At step 114, displaying 3D-Like image on a display screen of the device 12.

An apparatus for a camera system for use in a mobile handheld wireless device of a type of a smart phone and a tablet computer, with a front side with a display screen and a back side has the device is a mobile handheld wireless communication and computing device with a processor, a memory and an operating system and with a depth not exceeding half an inch, the device has a camera system with two separate and independent cameras positioned on the back side of the device, wherein the cameras have a physical separation between them of substantially a same separation that is between eyes on a human face.

The cameras, each camera with a body, a lens and a CCD image sensor, simultaneously capture two separate images of an object or a scene and a camera logic operating in the processor and the memory of the device merges the two images to create a single 3D-like image for storage and for viewing on the display screen.

The each camera of the camera system captures an overlapping view that point to the same object or the scene a distance away from the device, wherein the camera system creates a 3D-like single image for storage and for viewing on the display screen.

The camera system has a left camera and a right camera, that enable the left camera system to simultaneously take a left image of the object or the scene and the right camera system to take a right image of the object or of the scene. A 3D logic that merges the left camera image and the right camera image to create the single 3D-like image of the object.

The 3D logic takes pixels from the left image and the right image to merge the pixels to create a single 3D-like image. The 3D logic merges the images by positioning the right image pixels right of the left image pixels, thereby creating an image with all the pixels from the left and right images. The 3D logic positions on the display screen a pixel group from the left camera and a pixel group from the right camera contiguous to each other for a human vision to perceive them as a single point of image with details from both the pixel groups.

A camera system for use in a mobile handheld wireless device with a front side with a display screen and a back side, the device is of a type of a smart phone or a tablet computer with a CPU, a memory and an operating system and with a thickness that does not exceed half an inch and has two separate and independent cameras positioned on the front side of the device and wherein the cameras have a physical separation between them of substantially a same separation that is between eyes on a human face.

The cameras, each camera with a body, a lens and a CCD image sensor, capture two separate images of an object and a camera logic operating in a processor and a memory of the device merges the two images to create a 3D-like single image for storage and for viewing on a display screen. Each camera captures over lapping views that point to an object a distance away from the device, wherein the camera system creates a 3D-like image for storage and for viewing on a display screen.

The camera system has a left camera and a right camera that enable the left camera system to simultaneously take a left image of an object and the right camera system to take a right image of the object. A 3D logic merges the left camera image and the right camera image to create 3D-like image of the object. The 3D logic takes pixels from the left image and the right image to merge them to create a single image. The 3D logic merges the images by positioning the right image pixels right of the left image pixels, thereby creating an image with all the pixels from the left and right images.

A method for a camera system for use in a mobile handheld computing and communication device with a front side with a display screen and a back side has the following steps, where all the steps may not be sued or used in the order specified:

At step 100, having by the device two separate and independent cameras positioned on a side of the device.

At step 102, having by the cameras a physical distance between them of substantially the same distance between the eyes on a human face;

At step 104, capturing by each camera body with a lens and a CCD image sensor two separate images of an object and merging the images for the camera system to create a 3D-Like image for storage and for viewing on a display screen.

At step 106, having by each camera body with a lens and a CCD image sensor a view that is overlapping with the view from the other camera and point to an object or a scene a distance away from the device, wherein the camera system creates a 3D-Like image of an object for storage and for viewing on a display screen.

At step 108, having by the camera system a left camera and a right camera, that enable the left camera system to simultaneously take a left image of an object and the right camera system to take a right image of the object;

At step 110, merging by a 3D logic the left camera image and the right camera image to create a 3D-Like image of the object or the scene.

At step 112, merging by the logic pixels from the left image and the right image to create a single image.

At step 114, merging by the logic the images by positioning the right image pixels right of the left image pixels, thereby creating an image with all the pixels from the left and right images.

A method for a camera system for use in a mobile handheld wireless device with a front side with a display screen and a back side, comprising the steps of:

(a) providing a device of a type of a smart phone and a tablet computer with a CPU, a memory and an operating system and a camera logic, and with a thickness not exceeding half an inch and providing by the device two separate and independent cameras, each camera with a body, a lens and a CCD image sensor, positioned on a side of the device and providing by the cameras a physical separation between them of substantially a same separation that is between eyes on a human face;

(b) capturing by the cameras, two separate images of an object or a scene and merging by the camera logic operating in a processor and a memory of the device, the images to create a 3D-Like image for storage and for viewing on a display screen.

The method further, comprising the steps of:

capturing by each camera, over lapping views that point to an object or a scene a distance away from the device, and creating by the camera system a 3D-Like image of the object or the scene for storage and for viewing on a display screen.

The method further comprising the steps of:

(a) having by the camera system a left camera and a right camera, that enable the left camera system to simultaneously take a left image of an object or a scene and the right camera system to take a right image of the object or the scene;

(b) merging by a 3D logic the left camera image and the right camera image to create 3D-Like image of the object;

(c) merging by the logic pixels from the left image and the right image to create a single image;

(d) merging by the logic the images by positioning the right image pixels right of the left image pixels, thereby creating an image with all the pixels from the left and right images;

(e) positioning on a display screen a pixel group from a left camera and a pixel group from a right camera contiguous to each other for a human vision to perceive them as a single point of image with details from both the pixel groups.

In summary, the preferred embodiments are on a system 10 of a camera system for use in a mobile handheld computing and communication device with a front side with a display screen and a back side that has two separate and independent cameras positioned on the back side of the device and optionally also on the front side of the device.

The cameras have a physical distance between them of substantially the same distance between the eyes on a human face. Each camera body with a lens and a CCD image sensor points to an object or scene a distance away from the device, wherein the camera system creates a 3D-Like image of an object for storage and for viewing on a display screen.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. An apparatus for a camera system for use in a mobile handheld wireless device that is one of a smart phone and a tablet computer, with a front side with a display screen and a back side, comprising:

(a) the apparatus is a mobile handheld wireless communication and computing device with a processor, a memory and an operating system and with a depth not exceeding half an inch, the mobile handheld device has a camera system with two separate and independent cameras positioned on a back side of the mobile handheld device, wherein the cameras have a physical separation between them of substantially a same separation that is between eyes on a human face;

(b) the cameras, each camera with a body, a lens and a charge coupled device (CCD) image sensor, simultaneously capture two separate images of an object or a scene and a camera logic operating in the processor and the memory of the mobile handheld device merges the two separate images to create a single three dimension (3D-Like) image for storage and for viewing on the display screen;

(c) the camera logic takes data from individual pixels from the left image and the right image and merges the images by positioning individual pixels of the right image, to the right of the individual pixels of the left image in proximity, creating a pixel pair, wherein the pixel pair is visually perceived by a human as a single pixel with richer visual details then a pixel from ether of the two separate images.

2. The apparatus as in claim 1, comprising:
each camera of the camera system captures an overlapping view that point to a same object or a scene a distance away from the mobile handheld device, wherein the camera system creates a 3D-like single image for storage and for viewing on the display screen.

3. The apparatus as in claim 1, comprising:
(a) the camera system has a left camera and a right camera, that enable the left camera to simultaneously take a left camera image of the object or the scene and the right camera to take a right camera image of the object or of the scene;
(b) a 3D logic that merges the left camera image and the right camera image to create the single 3D-like image of the object.

4. The apparatus as in claim 3, comprising:
the 3D logic takes pixels from the left camera image and the right camera image to merge the pixels to create a single 3D-like image.

5. The apparatus as in claim 4, comprising:
the 3D logic merges the left camera image and the right camera image by positioning the right image pixels right of the left image pixels, thereby creating an image with all the pixels from the left and right images.

6. The apparatus as in claim 4, comprising:
the 3D logic positions on the display screen a pixel group from the left camera image and a pixel group from the right camera image contiguous to each other for a human vision to perceive them as a single point of image with details from both the pixel groups.

7. A camera system for use in a mobile handheld wireless device with a front side with a display screen and a back side, comprising:
(a) the mobile handheld device is one of a smart phone or a tablet computer with a central processing unit (CPU), a memory and an operating system and with a thickness that does not exceed half an inch and has two separate and independent cameras positioned on the front side of the mobile handheld device and wherein the two separate and independent cameras have a physical separation between them of substantially a same separation that is between eyes on a human face;
(b) the cameras, each camera with a body, a lens and a charge coupled device (CCD) image sensor, capture two separate images of an object and a camera logic operating in a processor and a memory of the mobile handheld device merges the two separate images to create a three dimension (3D-Like) single image for storage and for viewing on a display screen;
(c) the camera logic takes data from individual pixels from the left image and the right image and merges the images by positioning individual pixels of the right image, to the right of the individual pixels of the left image in proximity, creating a pixel pair, wherein the pixel pair is visually perceived by a human as a single pixel with richer visual details then a pixel from ether of the two separate images.

8. The camera system as in claim 7, comprising:
each camera captures over lapping views that point to an object a distance away from the mobile handheld device, wherein the camera system creates a 3D-like image for storage and for viewing on a display screen.

9. The camera system as in claim 7, comprising:
(a) the camera system has a left camera and a right camera, that enable the left camera to simultaneously take a left camera image of an object and the right camera to take a right camera image of the object;
(b) a 3D logic that merges the left camera image and the right camera image to create 3D-like image of the object.

10. The camera system as in claim 9, comprising:
the 3D logic takes pixels from the left camera image and the right camera image to merge them to create a single image.

11. The camera system as in claim 10, comprising:
the 3D logic merges the images by positioning the right camera image pixels right of the left camera image pixels, thereby creating an image with all the pixels from the left camera and right camera images.

12. A method for a camera system for use in a mobile handheld wireless device with a front side with a display screen and a back side, comprising the steps of:
(a) providing a mobile handheld device of one of a smart phone and a tablet computer with a central processing unit (CPU), a memory and an operating system and a camera logic, and with a thickness not exceeding half an inch and providing by the mobile handheld device two separate and independent cameras, each camera of the two separate and independent cameras with a body, a lens and a charge coupled device (CCD) image sensor, positioned on a side of the mobile handheld device and providing by the cameras a physical separation between them of substantially a same separation that is between eyes on a human face;
(b) capturing by the two separate and independent cameras, two separate images of an object or a scene and merging by the camera logic operating in a processor and a memory of the mobile handheld device, the two separate images to create a three dimension (3D-Like) image for storage and for viewing on a display screen;
(c) the camera logic takes data from individual pixels from the left image and the right image and merges the images by positioning individual pixels of the right image, to the right of the individual pixels of the left image in proximity, creating a pixel pair, wherein the pixel pair is visually perceived by a human as a single pixel with richer visual details then a pixel from ether of the two separate images.

13. The method as in claim 12, comprising the steps of:
capturing by each camera, over lapping views that point to an object or a scene a distance away from the mobile handheld device, and creating by the camera system a 3D-Like image of the object or the scene for storage and for viewing on a display screen.

14. The system as in claim 12, comprising the steps of:
(a) having by the camera system a left camera and a right camera, that enable the left camera to simultaneously take a left camera image of an object or a scene and the right camera to take a right camera image of the object or the scene;
(b) merging by a 3D logic the left camera image and the right camera image to create 3D-Like image of the object.

15. The method as in claim 14, comprising the steps of: merging by the logic pixels from the left camera image and the right camera image to create a single image.

16. The method as in claim 14, comprising the steps of: merging by the logic the images by positioning the right camera image pixels right of the left camera image pixels, thereby creating an image with all the pixels from the left camera and right camera images.

17. The method as in claim 14, comprising the steps of: positioning on a display screen a pixel group from a left camera and a pixel group from a right camera contiguous to each other for a human vision to perceive them as a single point of image with details from both the pixel groups.

\* \* \* \* \*